US012146648B1

(12) United States Patent
Yao

(10) Patent No.: US 12,146,648 B1
(45) Date of Patent: Nov. 19, 2024

(54) LIGHT MIRROR WITH FRONT LIGHT AND BACKLIGHT

(71) Applicant: Yuanpeng Yao, Guangdong (CN)

(72) Inventor: Yuanpeng Yao, Guangdong (CN)

( * ) Notice: Subject to any disclaimer, the term of this patent is extended or adjusted under 35 U.S.C. 154(b) by 0 days.

(21) Appl. No.: 18/395,669

(22) Filed: Dec. 25, 2023

(30) Foreign Application Priority Data

Oct. 25, 2023 (CN) ......................... 202322866526.5
Nov. 7, 2023 (CN) ......................... 202322998024.8

(51) Int. Cl.

| | |
|---|---|
| ***F21V 33/00*** | (2006.01) |
| ***A47G 1/22*** | (2006.01) |
| ***F21V 23/00*** | (2015.01) |
| ***F21W 131/302*** | (2006.01) |
| ***F21Y 103/10*** | (2016.01) |

(52) U.S. Cl.
CPC ............. *F21V 33/004* (2013.01); *A47G 1/22* (2013.01); *F21V 23/005* (2013.01); *F21W 2131/302* (2013.01); *F21Y 2103/10* (2016.08)

(58) Field of Classification Search
CPC ....... F21V 33/004; F21V 23/005; A47G 1/22; F21Y 2103/10
See application file for complete search history.

(56) References Cited

U.S. PATENT DOCUMENTS

| | | | | |
|---|---|---|---|---|
| 11,543,118 | B1 | 1/2023 | Zhan | |
| 11,927,337 | B1 * | 3/2024 | Tang | F21V 23/008 |
| 2004/0052084 | A1 * | 3/2004 | Lin | B60R 1/1207 362/135 |
| 2010/0118520 | A1 * | 5/2010 | Stern | A45D 42/10 362/135 |
| 2022/0010954 | A1 * | 1/2022 | Feit | G02B 5/08 |

* cited by examiner

*Primary Examiner* — Thomas M Sember
(74) *Attorney, Agent, or Firm* — Jose Cherson Weissbrot

(57) ABSTRACT

A lighted mirror with front light and backlight includes a mirror sheet; a rear frame is mounted on the rear surface of the mirror sheet, a light bar is mounted on the rear frame, and the center of the rear surface of the mirror sheet is provided with a primary reflection area; the periphery of the primary reflection area is provided with a light-transmitting area, and the periphery of the light-transmitting area is provided with a secondary reflection area; the rear frame is formed by splicing aluminum bars; the rear frame comprises an outer side wall located on the outer side, an inner side wall opposite to the outer side wall, a front side wall attached to the rear surface of the mirror sheet, and a rear side wall opposite to the front side wall.

10 Claims, 6 Drawing Sheets

LIGHT MIRROR WITH FRONT LIGHT AND BACKLIGHT

TECHNICAL FIELD

This invention generally relates to the technical field of mirrors, and more particularly, to a lighted mirror with front light and backlight.

BACKGROUND

U.S. Pat. No. 11,543,118B1 discloses a lighted mirror with front light and backlight, which comprises a mirror sheet and a rear frame mounted on the rear surface of the mirror sheet. A middle portion and an edge of the rear surface of the mirror sheet are provided with a first reflection area and a second reflection area, and a light-transmitting area is arranged between the first reflection area and the second reflection area. An inner light strip is arranged on the rear frame and directly faces the light-transmitting area, and the inner light strip directly emits light to the light-transmitting area to form a front light that serves as the main illumination light. An RGB outer light strip is arranged on a side surface of the rear frame, and the light-emitting direction of the RGB outer light strip is parallel to the mirror sheet to serve as backlight for providing back illumination. In the prior art, conventional lighted mirrors with front light and backlight require two light strips to respectively serve as a front light source and a backlight source, resulting in complex structure, high cost, and difficult assembly.

SUMMARY

The purpose of the present invention is to provide a lighted mirror with front light and backlight, which has few components, achieves low cost and realizes simple assembly.

To achieve the above purpose, the present invention adopts the following technical solution: a lighted mirror with front light and backlight comprises a mirror sheet, wherein a rear frame is mounted on the rear surface of the mirror sheet, a light bar is mounted on the rear frame, and the center of the rear surface of the mirror sheet is provided with a primary reflection area, wherein the periphery of the primary reflection area is provided with a light-transmitting area, and the periphery of the light-transmitting area is provided with a secondary reflection area, wherein the rear frame is formed by splicing aluminum bars, wherein the rear frame comprises an outer side wall located on the outer side, an inner side wall opposite to the outer side wall, a front side wall attached to the rear surface of the mirror sheet, and a rear side wall opposite to the front side wall, wherein the outer side wall is provided with a light groove extending in the circumferential direction of the rear frame, wherein a light bar is mounted in the light groove, wherein the outer side wall of the rear frame is located in the primary reflection area and at least flush with an edge of the primary reflection area.

Compared with the prior art, the present invention has the following advantages: the lighted mirror of the present invention is provided with a primary reflection area and a light-transmitting area located on the periphery of the primary reflection area: a rear frame is mounted on the rear surface of the lighted mirror, a light bar is mounted on an outer side wall of the rear frame, and the outer side wall is mounted in the primary reflection area: the light of the light bar is capable of being emitted out from the light-transmitting area and the rear surface of the mirror sheet: through adopting the present invention, front light and backlight are simultaneously provided by using a single light bar; the present invention has few components, achieves low cost and realizes simply assembly.

BRIEF DESCRIPTION OF THE DRAWINGS

FIG. 2 is a schematic diagram illustrating an enlarged structure of portion A in

FIG. 1;

DETAILED DESCRIPTION

To allow the features, technical means, purposes and functions of the present invention to be understood, the present invention is further described in detail below with reference to the drawings and specific embodiments.

Figure 1:
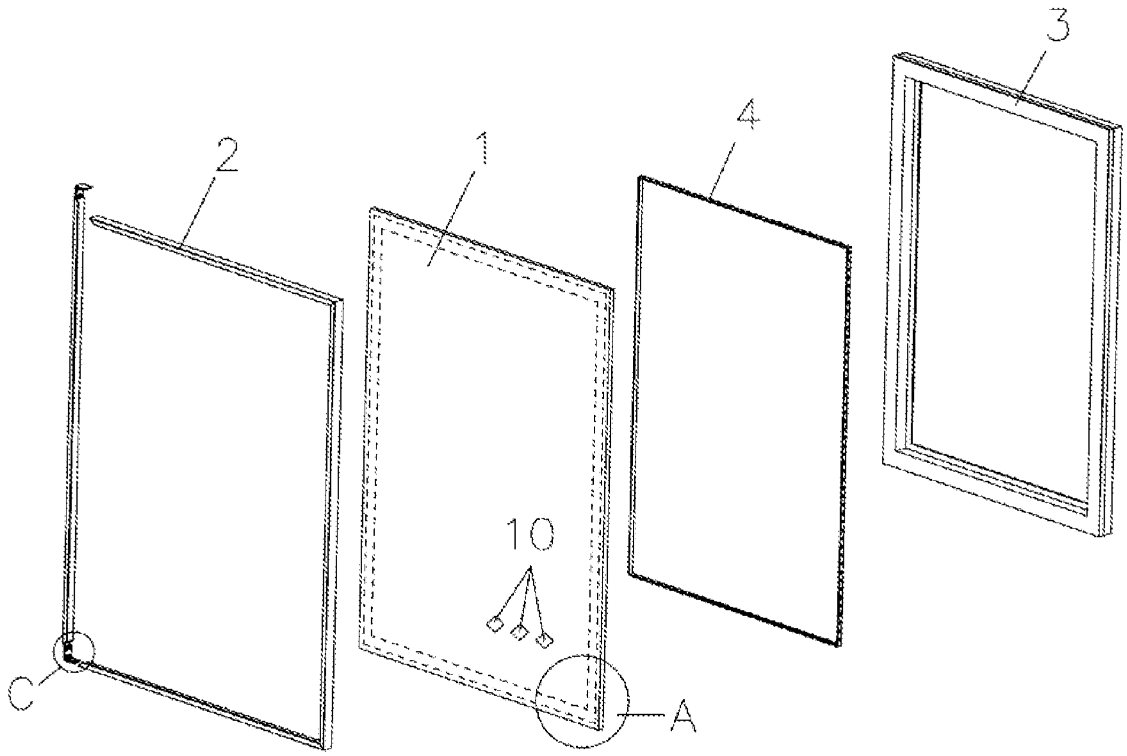
FIG. 1 is a schematic diagram illustrating an assembly structure of the present invention.
Figure 3:
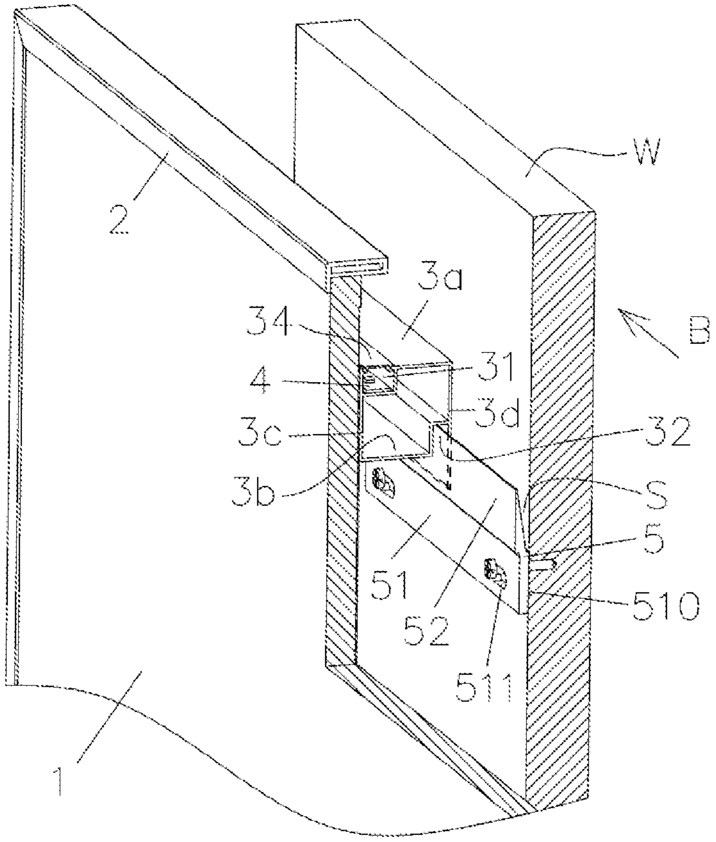
FIG. 3 is a schematic diagram illustrating a partial sectional view of the mounting structure of the present invention.
Figure 12:
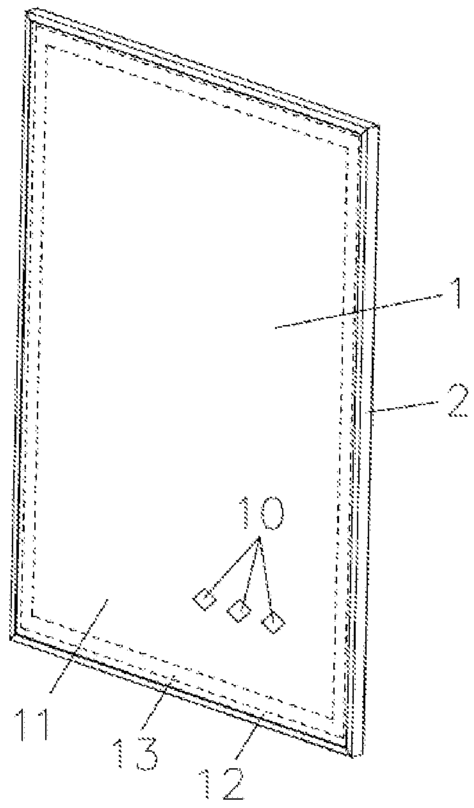
FIG. 12 is a schematic diagram illustrating an assembled structure of the present invention.

Referring to FIGS. 1, 3 and 12, a lighted mirror with front light and backlight comprises a mirror sheet 1, a frame 2 mounted on a side surface of the mirror sheet 1, a rear frame 3 mounted on a rear surface of the mirror sheet 1, a light bar 4 mounted on the rear frame 3, and a hanging plate 5 interacting with the rear frame 3 for hanging the mirror sheet 1.

Figure 2:
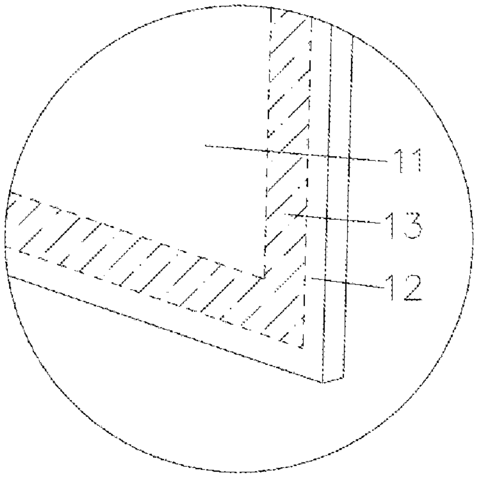

Referring to FIG. 2, the center of the rear surface of the mirror sheet 1 is provided with a primary reflection area 11, the periphery of the primary reflection area 11 is provided with a light-transmitting area 13, the periphery of the light-transmitting area 13 is provided with a secondary reflection area 12, and the front surface of the mirror sheet 1 is provided with a touch switch 10. The mirror sheet 1 is normally made of transparent glass. The primary reflection area 11 and the secondary reflection area 12 are formed by attaching a reflection film to the rear surface of the mirror sheet 1. Therefore, the peripheries of the primary reflection area 11 and the secondary reflection area 12 in FIG. 2 are represented by dashed lines. The light-transmitting area 13 does not have a reflection film, and a frosted layer is arranged on the mirror surface corresponding to the light-transmitting area 13, thereby forming a diffuse reflection such that the brightness is improved and the light is softened.

The touch switch 10 is capable of controlling the lighting of the lighted mirror and the electric appliance such as a demister.

Referring to FIGS. 1-6, the rear frame 3 is formed by splicing aluminum bars, and the aluminum bars have a hollow chamber and a closed outer wall. Through adopting this design, the weight and the material cost are significantly reduced. An outer wall of the rear frame 3 comprises an outer side wall 3*a* located on an outer side, an inner side wall 3*b* opposite to the outer side wall 3*a*, a front side wall 3*c* attached to the back side of the mirror sheet 1, and a rear side wall 3*d* opposite to the front side wall 3*c*. The outer side wall 3*a* is provided with a light groove 31 extending in the circumferential direction of the rear frame 3, the inner side wall 3*b* is provided with a mounting groove 32 adjacent to the rear side wall 3*d*, and the rear side wall 3*d* is provided with an insertion plate 33 extending towards the inner side wall 3*b* and exceeding the inner side wall 3*b*. A light bar 4 is mounted in the light groove 31, the light bar 4 comprises a circuit board 41 and LED light beads 4 mounted on the circuit board 41. A light scattering plate 34 is mounted on a light emission port of the light groove 31. The front side wall 3*c* of the rear frame 3 is attached to the rear surface of the mirror sheet 1 by using glue, and the outer side wall 3*a* of the rear frame 3 is located in the primary reflection area 11, or at least flush with an edge of the primary reflection area 12. In this way, the LED light beads 42 on the light bar 4 cannot be directly observed from the light-transmitting area 13, so that a glare phenomenon is avoided. Meanwhile, the light emitted by the light bar 4 is capable of penetrating out from a side surface of the mirror sheet and the light-transmitting area 13.

Because the primary reflection area and the light-transmitting area located on the periphery of the primary reflection area are arranged in the lighted mirror, the rear frame is mounted on the rear surface of the lighted mirror, the light bar is installed on the outer side in wall of the rear frame, and the outer side wall is mounted in the primary reflection area, the light of the light bar is capable of being emitted from the light-transmitting area and the rear surface of the mirror sheet. Thus, front light and backlight may be simultaneously provided by using one light bar, significantly reducing the use of components, lowering the cost and achieving a simple assembly.

Figure 6:
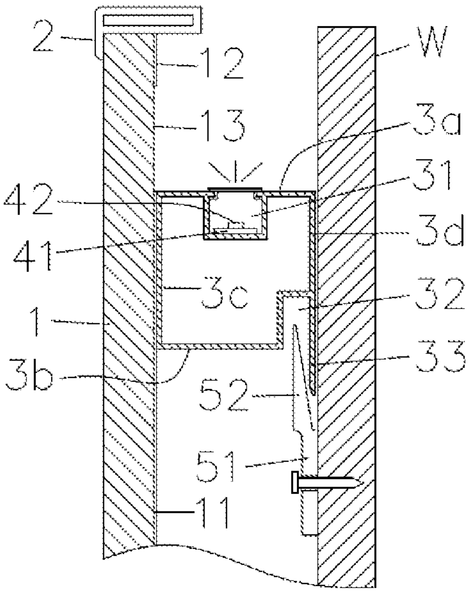
FIG. 6 is another schematic diagram illustrating a structure in FIG. 3 in direction B.

Referring to FIGS. 3 and 6, the light groove 31 may be arranged at the center of the outer side wall 3*a*, and the light-emitting direction of the light bar 4 is parallel to the mirror sheet 1. In this way, part of light of the light bar 4 is emitted from the rear surface of the mirror sheet 1 in a direction parallel to the mirror sheet 1 such that a backlight is formed. Part of the light may be transmitted out from the light-transmitting area of the mirror sheet 1 to form a main illumination light. In this structure, the contact surface between the rear frame 3 and the mirror sheet 1 is large, achieving high mounting strength and firmer structure.

Figure 4:
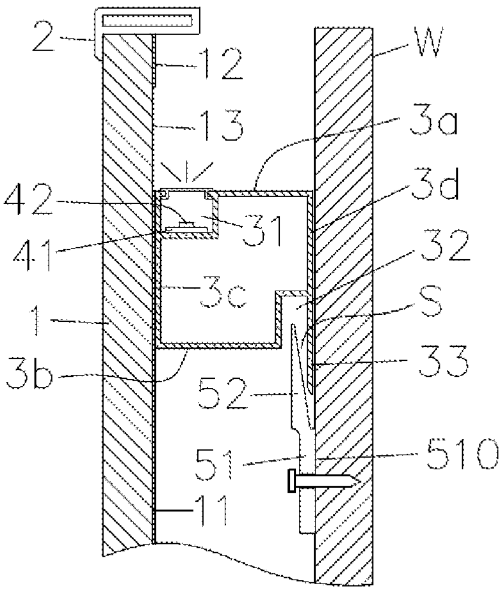
FIG. 4 is a schematic diagram illustrating a structure in FIG. 3 in direction B.
Figure 5:
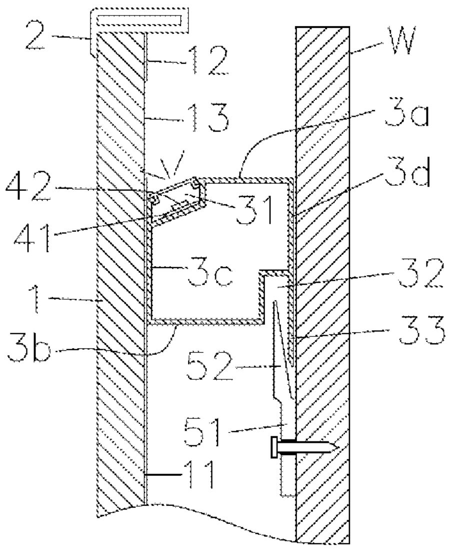
FIG. 5 is another schematic diagram illustrating a structure in FIG. 3 in direction B.

Referring to FIGS. 3 and 4, the light groove 31 may also be arranged on one side of the front side wall 3*c* in an offset manner, which enables the light bar 4 to be closer to the mirror sheet 1, so that the light emitted to the light-transmitting area 13 becomes more and the brightness becomes higher. Referring to FIGS. 3 and 5, the bottom of the light groove 31 may be inclined to the front side wall 3*c*, which allows the light-emitting direction of the light bar 4 to be inclined to the mirror sheet 1 such that the brightness of the main illumination light is further improved.

Referring to FIGS. 3 and 4, the hanging plate 5 comprises a fixing portion 51 and a hanging portion 52. The fixing portion 51 is provided with two mounting holes 511, and the mounting holes 511 are configured to be elongated, which achieves convenient mounting and easy alignment. One side of the fixing portion 51 attached to the wall surface W is a mounting surface 510, and an included angle formed between an inner side surface of the hanging portion 52 and a plane where the mounting surface 510 is located is an acute angle. After the hanging plate 5 is fixed on the wall surface W, an included angle gap S is formed between an inner side surface of the hanging portion 52 and the wall surface W. When the lighted mirror is mounted, the hanging portion 52 is clamped into the mounting groove 32 of the rear frame of the lighted mirror. At this point, the insertion plate 33 of the rear frame of the lighted mirror is embedded in the included angle gap S and is clamped and fixed by the hanging portion 52 and the wall surface W. This structure allows the insertion plate 33 to be more easily embedded into the included angle gap S. Meanwhile, after being inserted, the insertion plate 33 is clamped and fixed by the hanging portion 52 and the wall surface W, enabling the lighted mirror to be mounted more stably. The insertion plate 33 exceeds the inner side wall 3*b*, which allows the insertion plate 33 to be embedded into the included angle gap S more deeply, achieving a stable mounting of the lighted mirror. The mounting groove 32 and the insertion plate 33 are formed in the preparation process of the aluminum bar. The mounting groove 32 and the insertion plate 33 are clamped into the hanging plate 5 to be mounted and fixed therein. Through adopting this design, it is unnecessary to process an additional hanging on the rear frame 3, achieving simple manufacturing process and convenient mounting.

Figure 7:
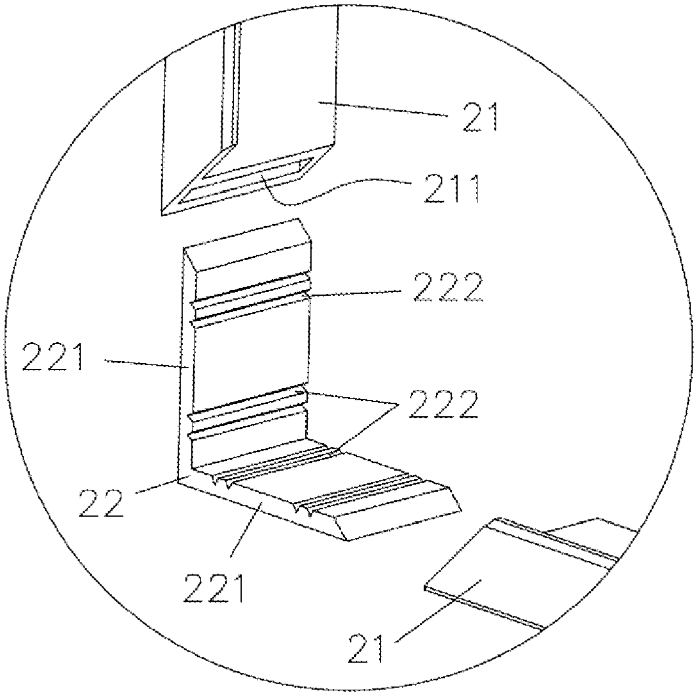
FIG. 7 is a schematic diagram illustrating an enlarged structure of portion C in FIG. 1.
Figure 8:
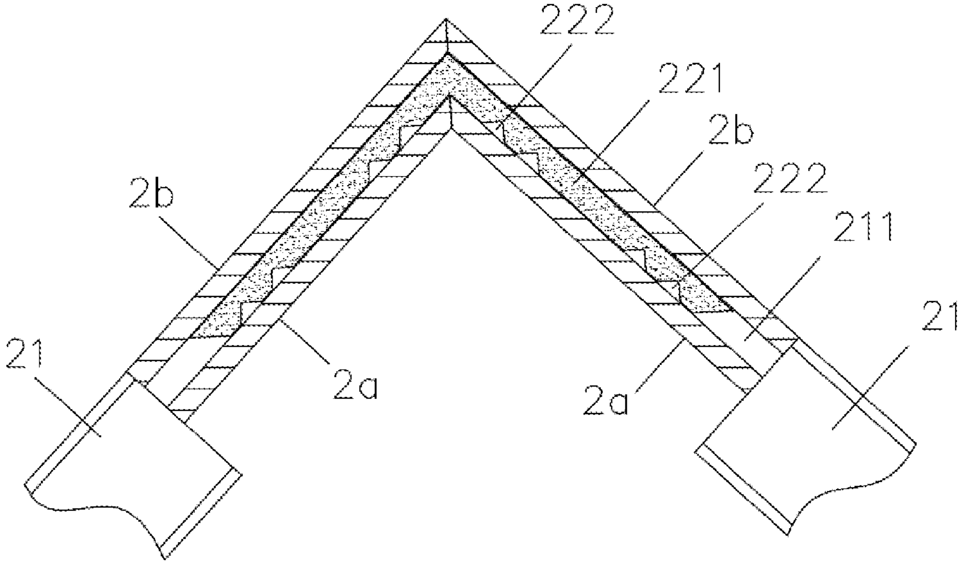
FIG. 8 is a schematic diagram illustrating an assembly step of the frame in step 1.
Figure 9:
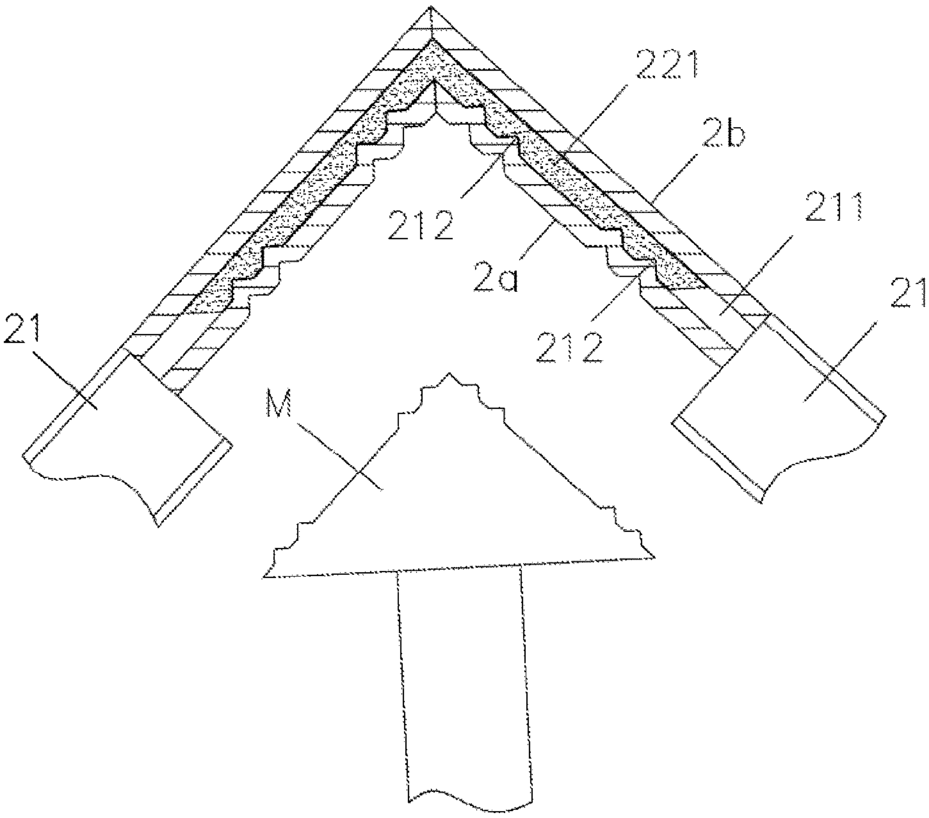
FIG. 9 is a schematic diagram illustrating an assembly step of the frame in step 2.

Referring to FIGS. 7-9, the frame 2 may be an arbitrary polygon, and each edge of the frame 2 is formed by an aluminum bar having a same cross section. In this embodiment, a rectangular frame is taken as an example. The frame 2 comprises four aluminum bars 21 and inner corner connectors 22 for connecting the aluminum bars 21. The aluminum bar 21 is provided with a flat hole 211, an inner side wall 2*a* attached to a side surface of the mirror sheet 1, and an outer side wall 2*b* opposite to the inner side wall 2*a*. The connection angle between two adjacent aluminum bars 21 is 90 degrees. When the shape of the frame 2 varies, the value of the connection angle between two adjacent aluminum bars 21 also varies. The inner corner connector 22, which is prepared by bending a sheet metal material, has two flat connecting arms 221 that are perpendicular to each other. An inner side surface of the connecting arm 221 is provided with a clamping groove 222. The connecting arms 221 of the inner corner connector are respectively inserted into the flat holes 211 of the two adjacent aluminum bars 21, and the clamping groove 222 faces the inner side wall 2*a* of the aluminum bar 21. A convex rib 212 is formed on the inner side wall 2*a* of the aluminum bar 21 at a position corresponding to the clamping groove 222 by using a punching method, and the convex rib 212 is clamped into the clamping groove 222. As a further improvement of the present invention, each connecting arm 221 is provided with four clamping grooves 222, wherein two clamping grooves 222 are close to the roots of the connecting arms 221, and the other two clamping grooves are close to the tail ends of the connecting arms 221. Thus, a stable connection is achieved. Because the convex rib 212 is arranged on the inner side wall 2*a* that is difficult to be observed, the outer surface of the frame 2 is cleaner and more aesthetic. Moreover, the flat hole 211 and the connecting arm 221 are configured to be flat, making the alignment of the aluminum bars 21 become easier.

Referring to FIGS. 8 and 9, the method for assembling the frame comprises: step 1: referring to FIG. 3, respectively inserting the two connecting arms 221 of the inner corner connector 22 into the flat holes 211 of the two aluminum bars to be assembled: step 2, referring to FIG. 4, placing the two aluminum bars 21 on a fixture for fixing, punching convex ribs 212 at inner sides of the aluminum bars 21 corresponding to the clamping grooves 222 of the connecting arms 221 by using a punching die M, clamping the convex ribs 212 into the clamping grooves 222, and fixing the two aluminum bars 21 and the inner corner connectors 22: in this way, the assembly of the two aluminum bars 21 is realized, and other aluminum bars may be assembled by following the aforesaid: because the connecting arm of the inner corner connector is provided with a clamping groove, the connecting arm is inserted into the flat hole of the aluminum bar, and the convex rib is punched on a side wall of the aluminum bar and clamped into the clamping groove to be fixed, the frame does not have exposed connecting members and manual screwing is avoided, achieving appealing look and high assembling efficiency.

Figure 10:
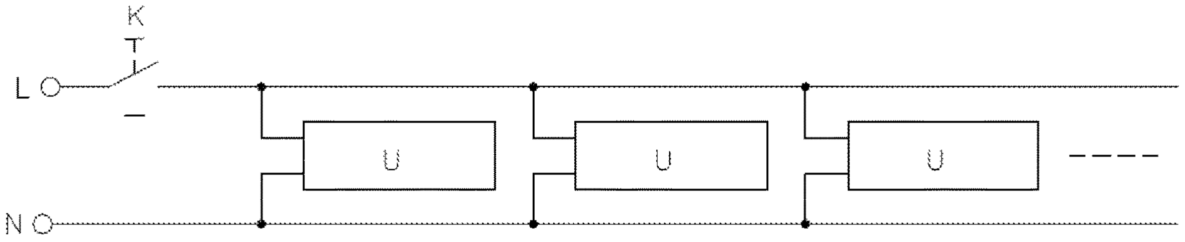
FIG. 10 is a general circuit diagram of a light bar circuit board.

Referring to FIG. 10, the total circuit structure on the circuit board 41 of the light bar 4 comprises a live line circuit L, a null line circuit N, and a plurality of control units U connected in parallel to the live line circuit L and the null line circuit N.

Figure 11:
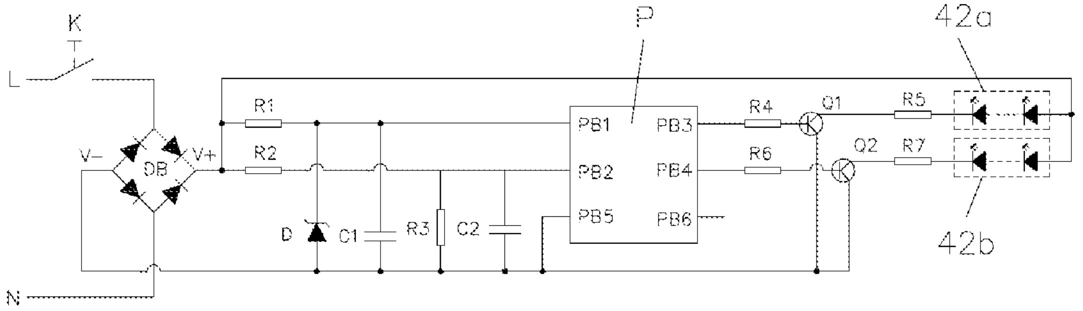
FIG. 11 is a circuit structure diagram of a control unit on the light bar circuit board.

Referring to FIG. 11, the control unit U comprises a chip bridge DB, a six-pin single-chip microcomputer P, a white light module 42*a* and a warm white light module 42*b*. Input ends of the chip bridge DB are respectively connected to the live line circuit L and the null line circuit N, and an output end of the chip bridge comprises a power supply positive pole V+ and a power supply negative pole V−. The six-pin single-chip microcomputer P comprises a positive electrode pin PB1, a negative electrode pin PB5, a detection pin PB2, a first output pin PB3, a second output pin PB4 and a third output pin PB6, wherein the white light module 42*a* and the warm white light module 42*b* are respectively formed by connecting white light LED light beads and warm white light LED light beads in series. The total operating voltage of the control unit U is the same as or similar to the voltage of the mains supply, allowing the control unit U to be directly connected to an AC (alternating current) mains supply without using a driving power supply. The positive electrode pin PB1 of the six-pin single-chip microcomputer P is connected to the power supply positive pole V+ through a first resistor R1 and is connected to the power supply negative pole V-through a voltage stabilizing diode D and a first capacitor C1 that are connected in parallel. The negative electrode pin PB5 of the six-pin single-chip microcomputer P is directly connected to the power supply negative pole V−. The detection pin PB2 is connected to the power supply positive pole V+through a second resistor R2 and is connected to the power supply negative pole V-through a third resistor R3 and a second capacitor C2 that are connected in parallel. The first output pin PB3 of the six-pin single-chip microcomputer P is connected to the base electrode of a first triode Q1 through a fourth resistor R4, the emitter electrode of the first triode Q1 is connected to the power supply negative pole V−, the collector electrode of the first triode Q1 is connected to the negative pole of the white light module 42*a* through a fifth resistor R5, and the positive pole of the white light module 42*a* is connected to the power supply positive pole V+. The second output pin PB4 of the six-pin single-chip microcomputer P is connected to the base electrode of a second triode Q2 through a sixth resistor R6, the emitter electrode of the second triode Q2 is connected to the power supply negative pole V−, the collector electrode of the second triode Q2 is connected to the negative pole of the warm white light module 42*b* through a seventh resistor R7, and the positive pole of the warm white light module 42*b* is connected to the power supply positive pole V+.

Referring to FIG. 11, the control principle of the circuit is as follows: the live line circuit L and the null line circuit N are connected to a mains supply, the live line circuit L or the null line circuit N is provided with a power switch K, and the control unit P performs a dimming control through multiple switching-on and switching-off of the power switch K. There are three control modes: a first control mode (100% of white light), a second control mode (100% of warm white light), and a third control mode (100% of warm white light and 100% of white light).

When the power switch K is switched off for the first time, the single-chip microcomputer performs a control according to the first mode, and when the power switch is switched off for the second time, the single-chip microcomputer detects the charging and discharging duration of the second capacitor C2 through the detection pin PB2 to determine the switching period. If the switching period is within a set duration, the second control mode is performed, and if the switching period exceeds the set duration, the second control mode is switched to the first control mode. The third control mode is performed in the same way. Because a six-pin single-chip microcomputer is used as the control chip, a triode is used as the switch circuit, the size of the electronic elements becomes small, and the circuit structure becomes simple. Thus, the width of the circuit board is reduced, and the size of the rear frame is further reduced.

The aforesaid are merely some preferred embodiments of the present invention. Although being described in details, these embodiments cannot be understood as a limitation to the scope of the present invention. It should be noted that various improvements and modifications may be made by those skilled in the art without departing from the principles of the present invention. Therefore, these improvements and modifications shall also fall into the scope of the present invention. The scope of the present invention is defined by the claims of the present invention.

What is claimed is:

1. A lighted mirror with front light and backlight, comprising:

a mirror sheet, wherein a rear frame is mounted on a rear surface of the mirror sheet, a light bar is mounted on the rear frame, and a center of the rear surface of the mirror sheet is provided with a primary reflection area, wherein a periphery of the primary reflection area is provided with a light-transmitting area, and a periphery of the light-transmitting area is provided with a secondary reflection area, wherein the rear frame is formed by splicing aluminum bars, wherein the rear frame further comprises an outer side wall located on an outer side, an inner side wall opposite to the outer side wall, a front side wall attached to the rear surface of the mirror sheet, and a rear side wall opposite to the front side wall, wherein the outer side wall is provided with a light groove extending in a circumferential direction of the rear frame, wherein a light bar is mounted in the light groove, wherein the outer side wall of the rear frame is located in the primary reflection area and at least flush with an edge of the primary reflection area;

wherein the light groove is located on a side of the outer side wall that is offset from the front side wall;

wherein the bottom of the light groove is inclined to the front side wall.

2. The lighted mirror with front light and backlight of claim 1, wherein the light groove is located at a center of the outer side wall.

3. The lighted mirror with front light and backlight of claim 1, wherein the lighted mirror further comprises a hanging plate, wherein the hanging plate comprises a fixing portion and a hanging portion, wherein one side of the fixing portion attached to a wall surface is a mounting surface, and an included angle is formed between an inner side surface of the hanging portion and a plane where a mounting surface is located, wherein after the hanging plate is fixed on the wall surface, an included angle gap is formed between an inner side surface of the hanging portion and the wall surface, wherein an inner side wall of the rear frame is provided with a mounting groove adjacent to the rear side wall, and the rear side wall is provided with an insertion plate extending towards the inner side wall, wherein when the lighted mirror is mounted, the hanging portion is clamped into the mounting groove, and the insertion plate is embedded in the included angle gap and is clamped and fixed by the hanging portion and the wall surface.

4. The lighted mirror with front light and backlight of claim 3, wherein the insertion plate exceeds the inner side wall.

5. The lighted mirror with front light and backlight of claim 1, wherein the light bar further comprises a circuit board, as well as a white light module and a warm white light module mounted on the circuit board, wherein the circuit board is provided with a live line circuit, a null line circuit and a plurality of control units connected to the live line circuit and the null line circuit in parallel and having an operating voltage equal to that of a mains supply, wherein each of the control units further comprises a chip bridge, a six-pin single-chip microcomputer, a white light module and a warm white light module, wherein input ends of the chip bridge are respectively connected to the live line circuit and the null line circuit, and an output end of the chip bridge further comprises a power supply positive pole and a power supply negative pole, wherein the six-pin single-chip microcomputer further comprises a positive electrode pin, a negative electrode pin, a detection pin, a first output pin, a second output pin and a third output pin, wherein the white light module and the warm white light module are respectively formed by connecting white light LED light beads and warm white light LED light beads in series, wherein the positive electrode pin of the six-pin single-chip microcomputer is connected to the power supply positive pole through a first resistor and is connected to the power supply negative pole through a voltage stabilizing diode and a first capacitor that are connected in parallel, wherein the negative electrode pin of the six-pin single-chip microcomputer is directly connected to the power supply negative pole, wherein the detection pin is connected to the power supply positive pole through a second resistor and is connected to the power supply negative pole through a third resistor and a second capacitor that are connected in parallel, wherein the first output pin of the six-pin single-chip microcomputer is connected to a base electrode of a first triode through a fourth resistor, an emitter electrode of the first triode is connected to the power supply negative pole, a collector electrode of the first triode is connected to the negative pole of the white light module through a fifth resistor, and the positive pole of the white light module is connected to the power supply positive pole, wherein a second output pin of the six-pin single-chip microcomputer is connected to the base electrode of a second triode through a sixth resistor, the emitter electrode of the second triode is connected to the power supply negative pole, and the collector electrode of the second triode is connected to a negative pole of the warm white light module through a seventh resistor.

6. The lighted mirror with front light and backlight of claim 1, wherein the frame is formed by assembling a plurality of aluminum bars according to a certain angle, wherein the aluminum bars are respectively provided with a hole, and an inner corner connector is arranged at a position where the aluminum bars are assembled, wherein the inner corner connector further comprises two connecting arms, and the two connecting arms are assembled at the same angle as that of the aluminum bars, wherein a clamping groove is formed in the connecting arm, the two connecting arms are respectively inserted into holes of two adjacent aluminum bars, and convex ribs clamped into clamping grooves are arranged on the aluminum bars and correspond to the clamping grooves.

7. The lighted mirror with front light and backlight of claim 6, wherein the clamping groove is formed on an inner side surface of the connecting arm, and the convex rib is arranged on an inner side wall of the aluminum bar.

8. The lighted mirror with front light and backlight of claim 6, wherein a hole is configured to be flat, and the connecting arm is configured to be flat for interacting with the hole.

9. The lighted mirror with front light and backlight of claim 6, wherein clamping grooves are respectively formed close to root and tail portions of the connecting arm.

10. The lighted mirror with front light and backlight of claim 9, wherein two clamping grooves are respectively formed close to the root and tail portions of the connecting arm.

* * * * *